United States Patent
Kreines et al.

(10) Patent No.: US 12,137,109 B2
(45) Date of Patent: Nov. 5, 2024

(54) DETECTION OF WIRELESS COMMUNICATION HIJACKING

(71) Applicant: Red Bend Ltd., Hod Hasharon (IL)

(72) Inventors: Alexander Kreines, Jerusalem (IL); Shachar Mendelowitz, Herzliya (IL); Roee Salomon, Herzliya (IL); Ori Goldberg, Kiryat Ono (IL)

(73) Assignee: RED BEND LTD., Hod Hasharon (IL)

( * ) Notice: Subject to any disclaimer, the term of this patent is extended or adjusted under 35 U.S.C. 154(b) by 298 days.

(21) Appl. No.: 17/905,595

(22) PCT Filed: Mar. 5, 2020

(86) PCT No.: PCT/IB2020/051895
§ 371 (c)(1),
(2) Date: Sep. 2, 2022

(87) PCT Pub. No.: WO2021/176252
PCT Pub. Date: Sep. 10, 2021

(65) Prior Publication Data
US 2023/0110820 A1   Apr. 13, 2023

(51) Int. Cl.
*H04L 9/40* (2022.01)
(52) U.S. Cl.
CPC ............................. *H04L 63/1425* (2013.01)
(58) Field of Classification Search
CPC .................................................. H04L 63/1425
USPC .......................................................... 726/23
See application file for complete search history.

(56) References Cited

U.S. PATENT DOCUMENTS

| | | | | |
|---|---|---|---|---|
| 2014/0340193 | A1* | 11/2014 | Zivkovic | G07C 9/00309 |
| | | | | 340/5.61 |
| 2015/0195296 | A1* | 7/2015 | Vasseur | G06N 3/02 |
| | | | | 726/23 |
| 2021/0001806 | A1* | 1/2021 | Kim | B60R 25/24 |

FOREIGN PATENT DOCUMENTS

| | | | |
|---|---|---|---|
| CN | 115499842 A | * | 12/2022 |
| KR | 20170033788 A | | 3/2017 |
| WO | 2016096836 A1 | | 6/2016 |
| WO | 2016206610 A1 | | 12/2016 |
| WO | 2018014937 A1 | | 1/2018 |
| WO | WO-2020149014 A1 | * | 7/2020 |

(Continued)

OTHER PUBLICATIONS

Wang et al., "Location Hijacking Attack in Software-Defined Space-Air-Ground-Integrated Vehicular Network," in IEEE Internet of Things Journal, vol. 9, No. 8, pp. 5971-5981, 15 Apr. 15, 2022, doi: 10.1109/JIOT.2021.3062886. (Year: 2022).*

(Continued)

*Primary Examiner* — Peter C Shaw
(74) *Attorney, Agent, or Firm* — McCoy Russell LLP (57) ABSTRACT

Examples are disclosed for methods and mechanisms to address Base Transceiver Stations (BTSes) attempting to hijack Mobile Stations (MSes) in wireless communication networks. In some example methods, a record having values for a set of features associated with an MS and a BTS of a wireless communication net may be processed. A score for the record may be calculated, for example based on a machine-learning model pertaining to the set of features, and a determination may be made as to whether the record demonstrates an anomalous condition based upon the score. The set of features may include at least one feature based on a measured power of the BTS.

15 Claims, 8 Drawing Sheets

(56) References Cited

FOREIGN PATENT DOCUMENTS

| WO | WO-2021158609 A2 * | 8/2021 | ............ G01S 1/0428 |
| WO | WO-2023114616 A1 * | 6/2023 | ............ H04L 27/261 |

OTHER PUBLICATIONS

Dong et al., "Comparative Study on Supervised versus Semi-supervised Machine Learning for Anomaly Detection of In-vehicle CAN Network," 2022 IEEE 25th International Conference on Intelligent Transportation Systems (ITSC), Macau, China, 2022, pp. 2914-2919, doi: 10.1109/ITSC55140.2022.9922235. (Year: 2022).*
Roy et al., "State of the art analysis of network traffic anomaly detection," 2014 Applications and Innovations in Mobile Computing (AIMoC), Kolkata, India, 2014, pp. 186-192, doi: 10.1109/AIMOC.2014.6785539. (Year: 2014).*
Tang et al., "Research on Internet of Vehicles Attack Prediction Based on Federated Learning," 2021 IEEE Conference on Telecommunications, Optics and Computer Science (TOCS), Shenyang, China, 2021, pp. 574-578, doi: 10.1109/TOCS53301.2021.9688653. (Year: 2021).*
Jin, J. et al., "Rogue Base Station Detection Using a Machine Learning Approach," Proceedings of the 28th Wireless and Optical Communication Conference (WOCC 2019), May 9, 2019, Beijing, China, 6 pages.
ISA Korean Intellectual Property Office, International Search Report Issued in Application No. PCT/IB2020/051895, Nov. 12, 2020, WIPO, 6 pages.
ISA Korean Intellectual Property Office, Written Opinion of the International Searching Authority Issued in Application No. PCT/IB2020/051895, Nov. 12, 2020, WIPO, 9 pages.

* cited by examiner

DETECTION OF WIRELESS COMMUNICATION HIJACKING

CROSS-REFERENCE TO RELATED APPLICATIONS

The present application is a U.S. National Phase of International Patent Application Serial No. PCT/IB2020/051895 entitled "DETECTION OF WIRELESS COMMUNICATION HIJACKING," filed on Mar. 5, 2020. The entire contents of the above-referenced application are hereby incorporated by reference for all purposes.

FIELD

The disclosure relates to security provisions for mobile stations of wireless communication networks.

BACKGROUND

In wireless communication systems, Mobile Stations may be in wireless communication with various Base Transceiver Stations of a network. Some Mobile Stations may be incorporated within hand-held devices such as cellular phones, while other Mobile Stations may be incorporated within vehicle-based telecommunications equipment. Devices and equipment operating in conformance with the most recent wireless communication standards may enjoy relatively robust security against attacks. For purposes of backward compatibility, the same devices and equipment may also be capable of conforming with less-recent wireless communication standards, which may be less robust against attacks. Some attacking devices may engage in schemes to lure devices and equipment into conforming to less-recent, less-secure wireless communication standards.

SUMMARY

In order to address scenarios in which attacking devices may attempt to lure devices and equipment operating on wireless communication networks into conforming to less-recent, less-secure wireless communication standards, a Mobile Station (MS) may employ methods or circuitries for detecting and responding to wireless communication hijacking. In a first mode, an MS in communication with a Base Transceiver Station (BTS) may monitor various properties associated with a candidate BTS to determine whether the candidate BTS is a hijacking BTS. In a second mode, an MS in communication with a BTS to which it is currently connected may monitor various properties associated with the current BTS as well as various properties associated with a candidate BTS to determine whether the current BTS is a hijacking BTS.

Disclosed herein are various methods and mechanisms for addressing potentially-hijacking BTSes. In some embodiments, methods for addressing potentially-hijacking BTSes may comprise processing a record having values for a set of obtained data associated with an MS and a BTS of a wireless communication network. A score for the record may be calculated based on a machine-learning model pertaining to a set of features that are functions of the obtained data. The record may be determined to demonstrate an anomalous condition based upon the score. In some embodiments, the set of features may include at least one feature based on a measured power of the BTS.

For some embodiments, methods for monitoring wireless cellular communication between a first BTS, a second BTS, and an MS incorporated within a vehicle may comprise, in a first mode, monitoring for anomalies in a set of intra-cell properties associated with the MS and a first Base Transceiver Station (BTS) of a wireless cellular communication network; and, in a second mode, monitoring for anomalies in a set of inter-cell properties associated with the MS, the first BTS, and a second BTS of the wireless cellular communication network. At least one of the set of intra-cell properties is based on a measured power of the BTS; and at least one of the set of inter-cell properties is based a measured power of the BTS corresponding with an earlier set of intra-cell properties.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
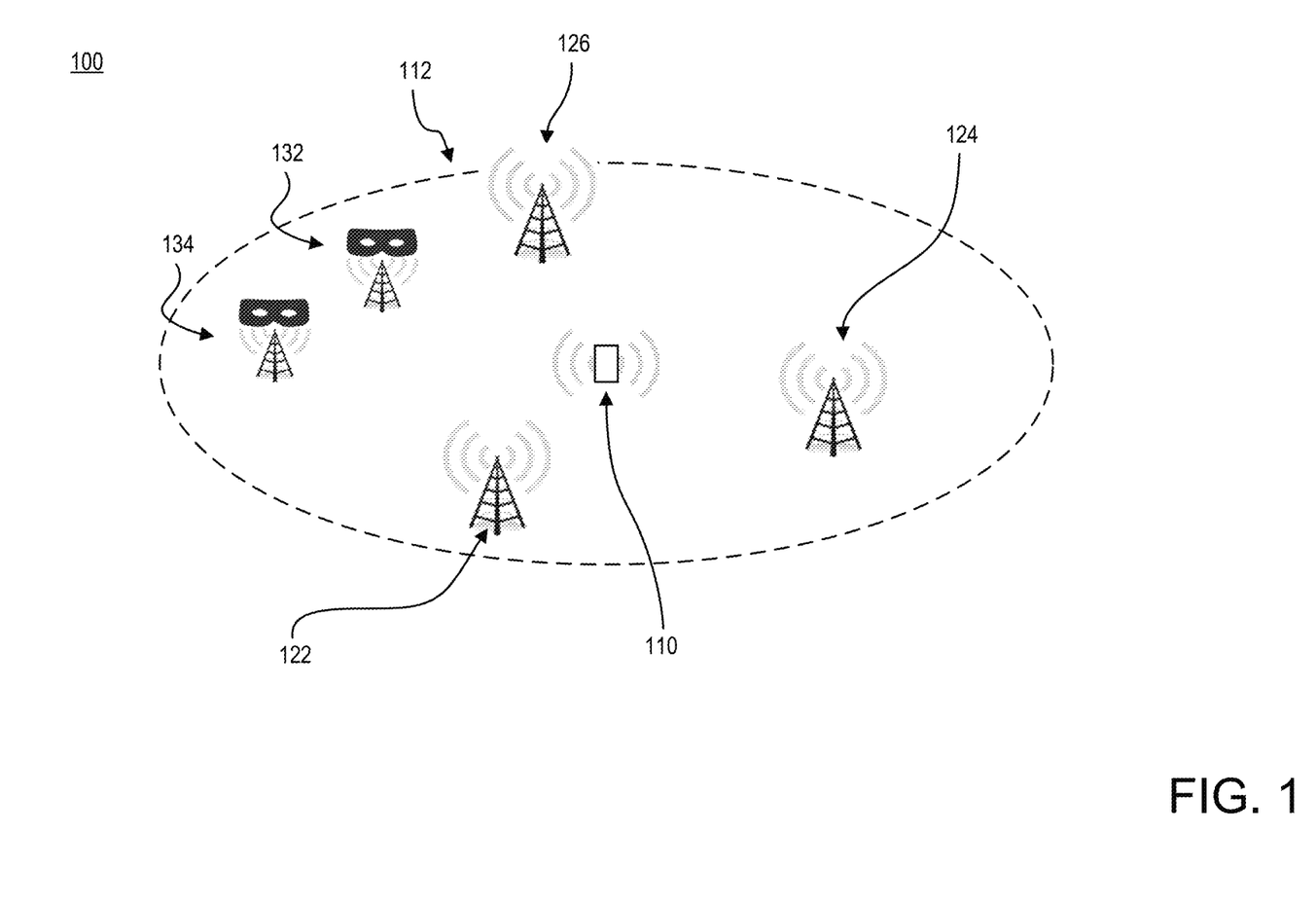
FIG. 1 shows a first wireless communication hijacking scenario in accordance with one or more embodiments of the present disclosure.
Figure 2:
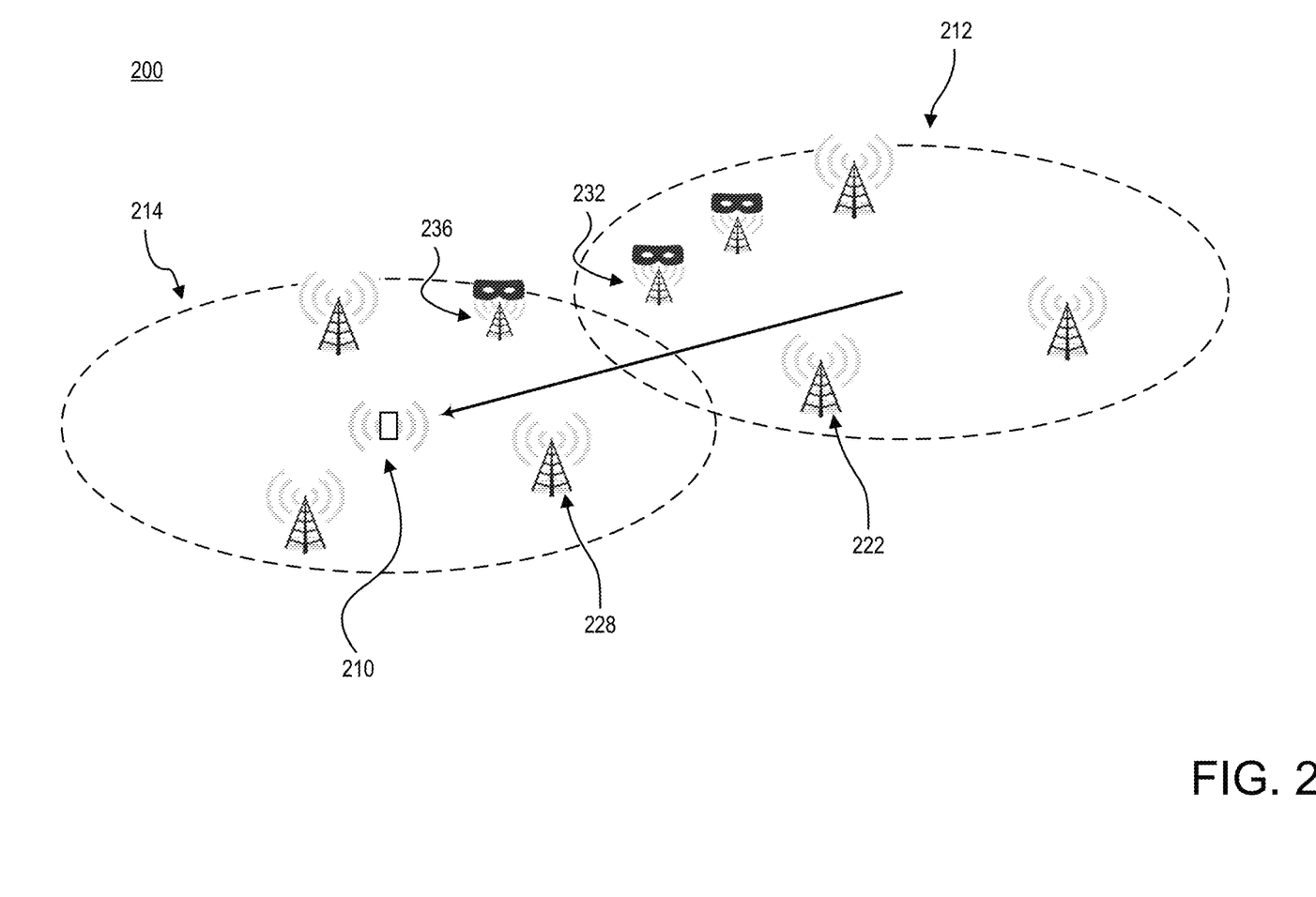
FIG. 2 shows a second wireless communication hijacking scenario in accordance with one or more embodiments of the present disclosure.
Figure 3:
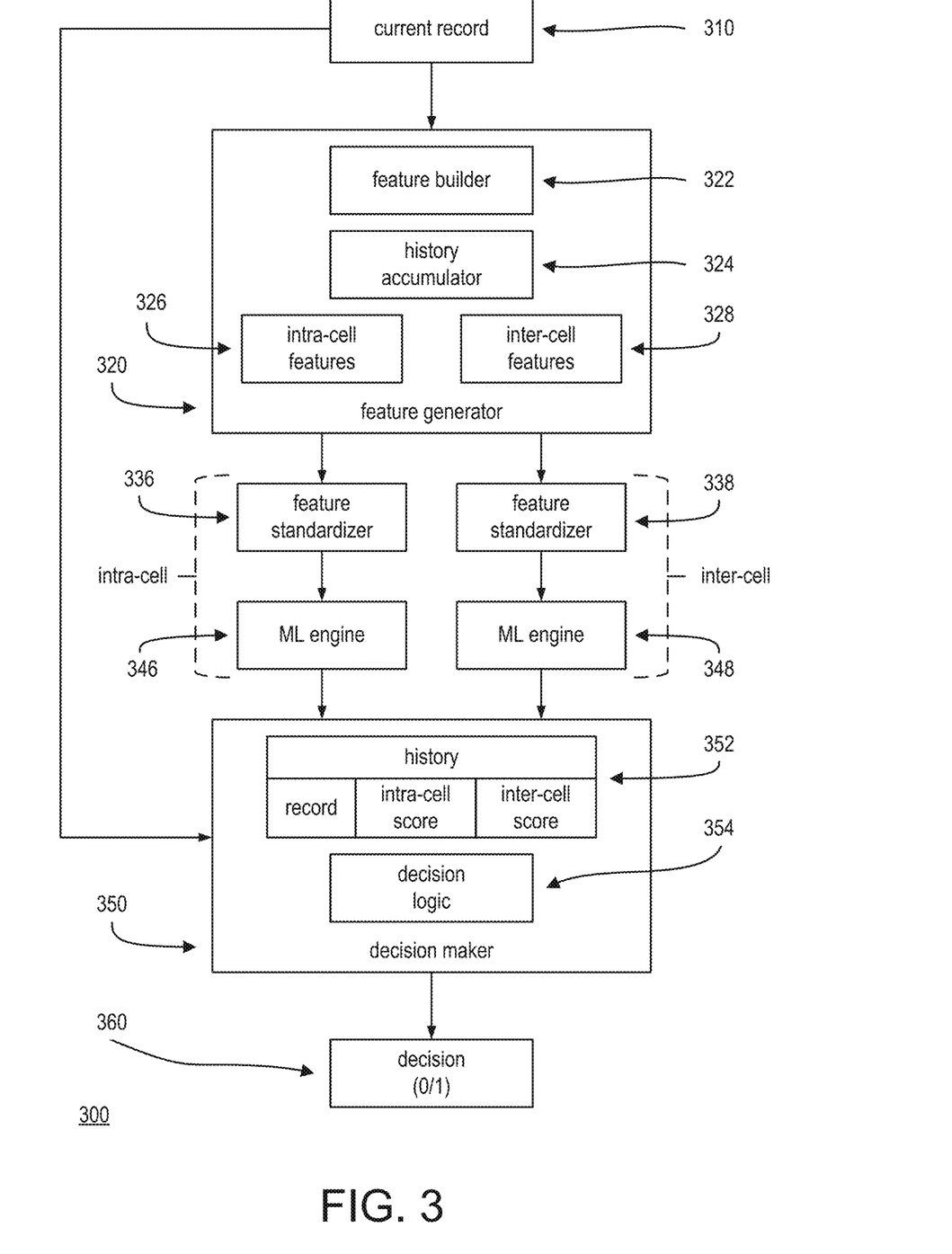
FIG. 3 shows a block diagram of a hijacking detector in accordance with one or more embodiments of the present disclosure.
Figure 4A:
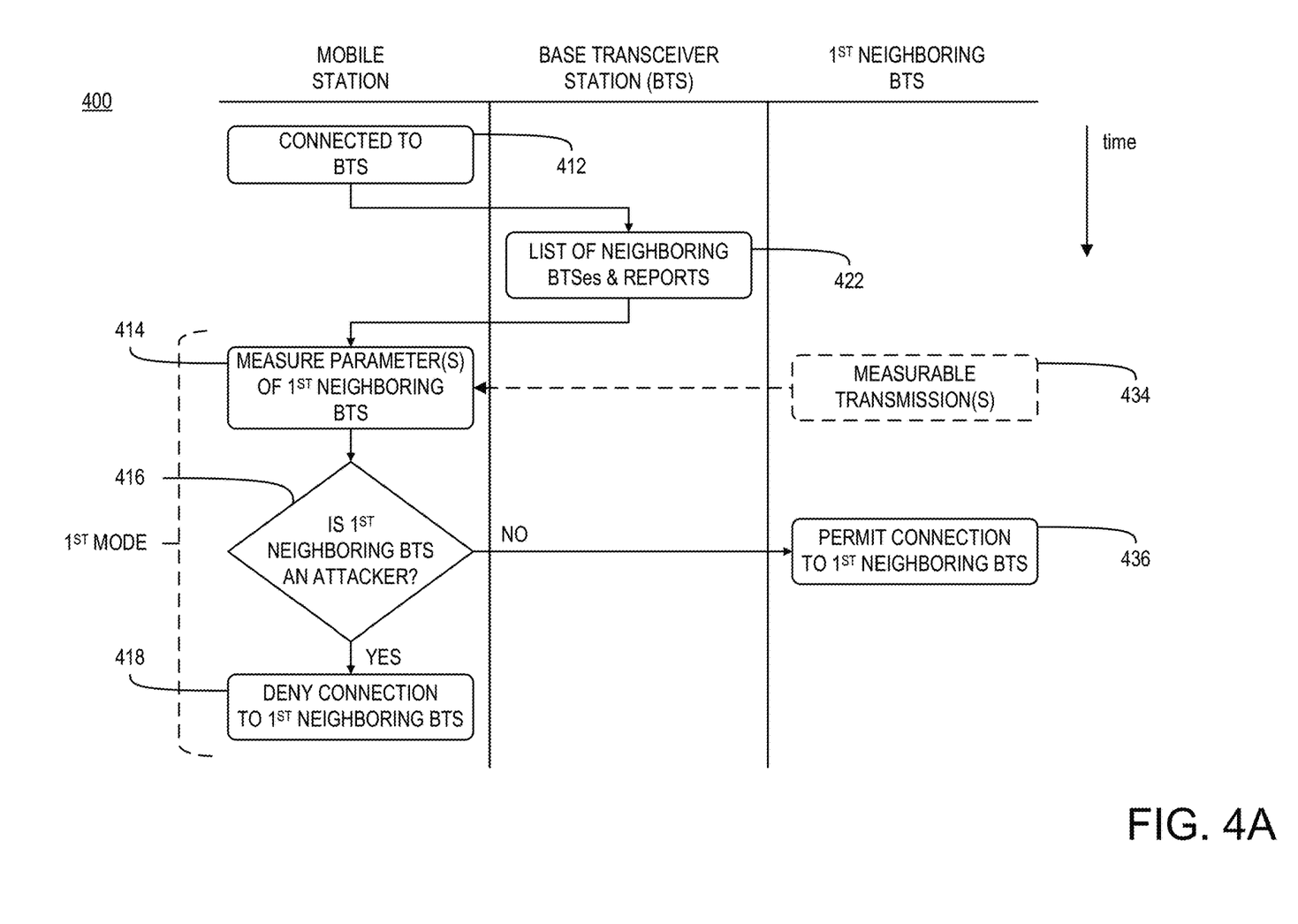
FIGS. 4A and 4B show timelines pertaining to methods for detecting hijacking scenarios in accordance with one or more embodiments of the present disclosure.
Figure 4B:
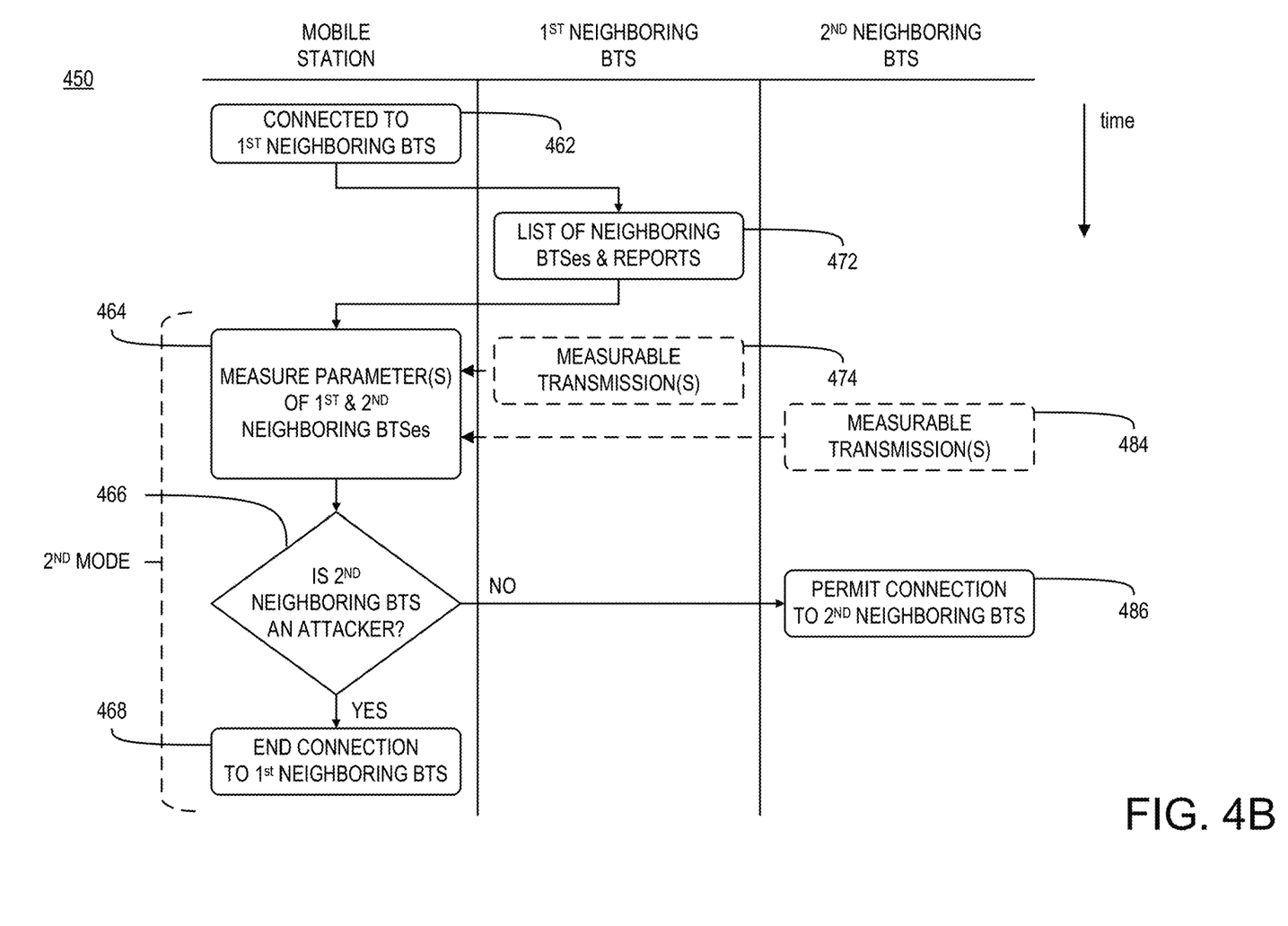
Figure 5:
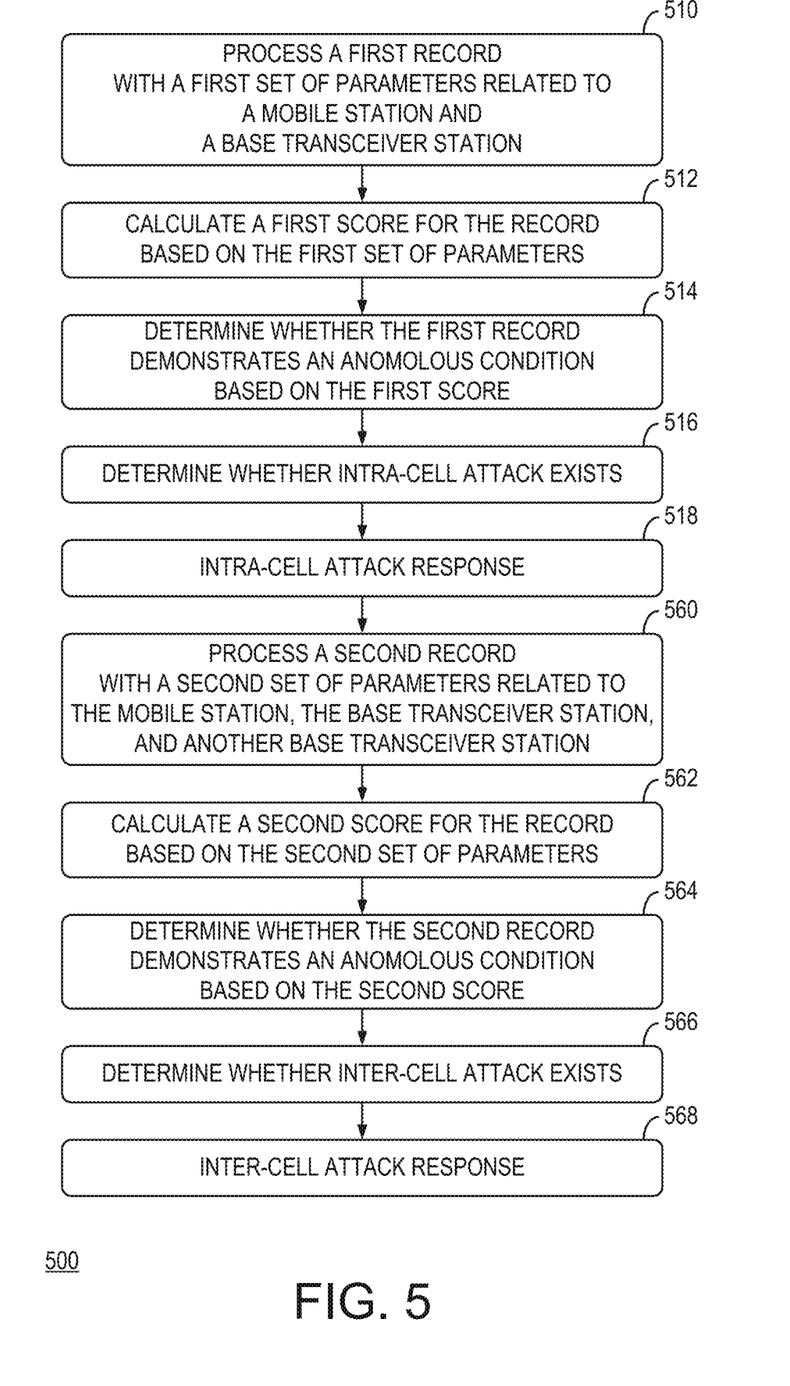
FIG. 5 shows a flow chart of methods for detecting hijacking scenarios in accordance with one or more embodiments of the present disclosure.
Figure 6:
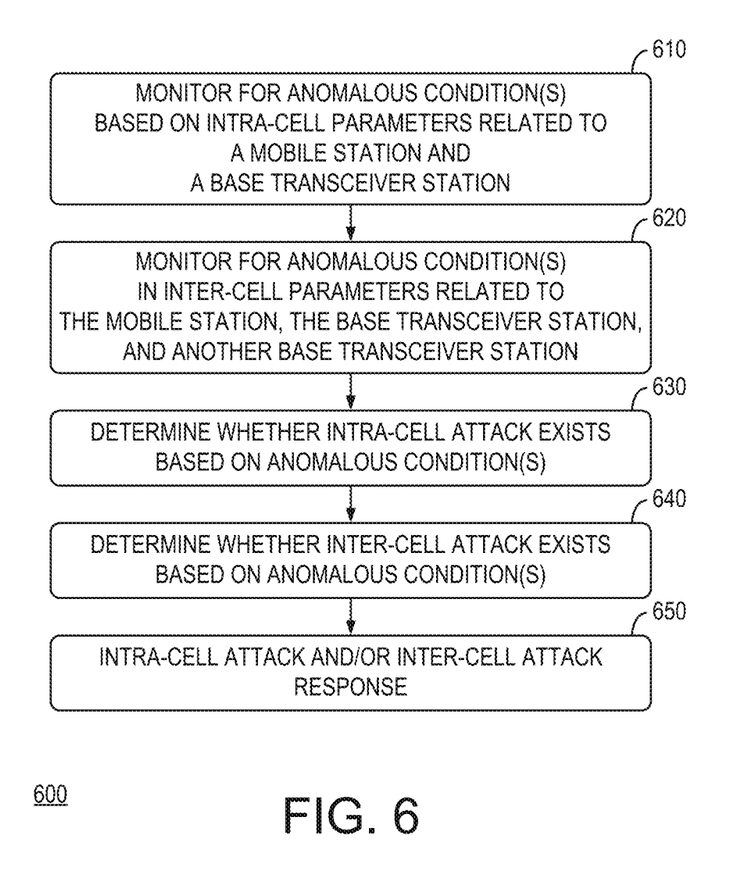
FIG. 6 shows a flow chart of methods for detecting hijacking scenarios in accordance with one or more embodiments of the present disclosure.
Figure 7:
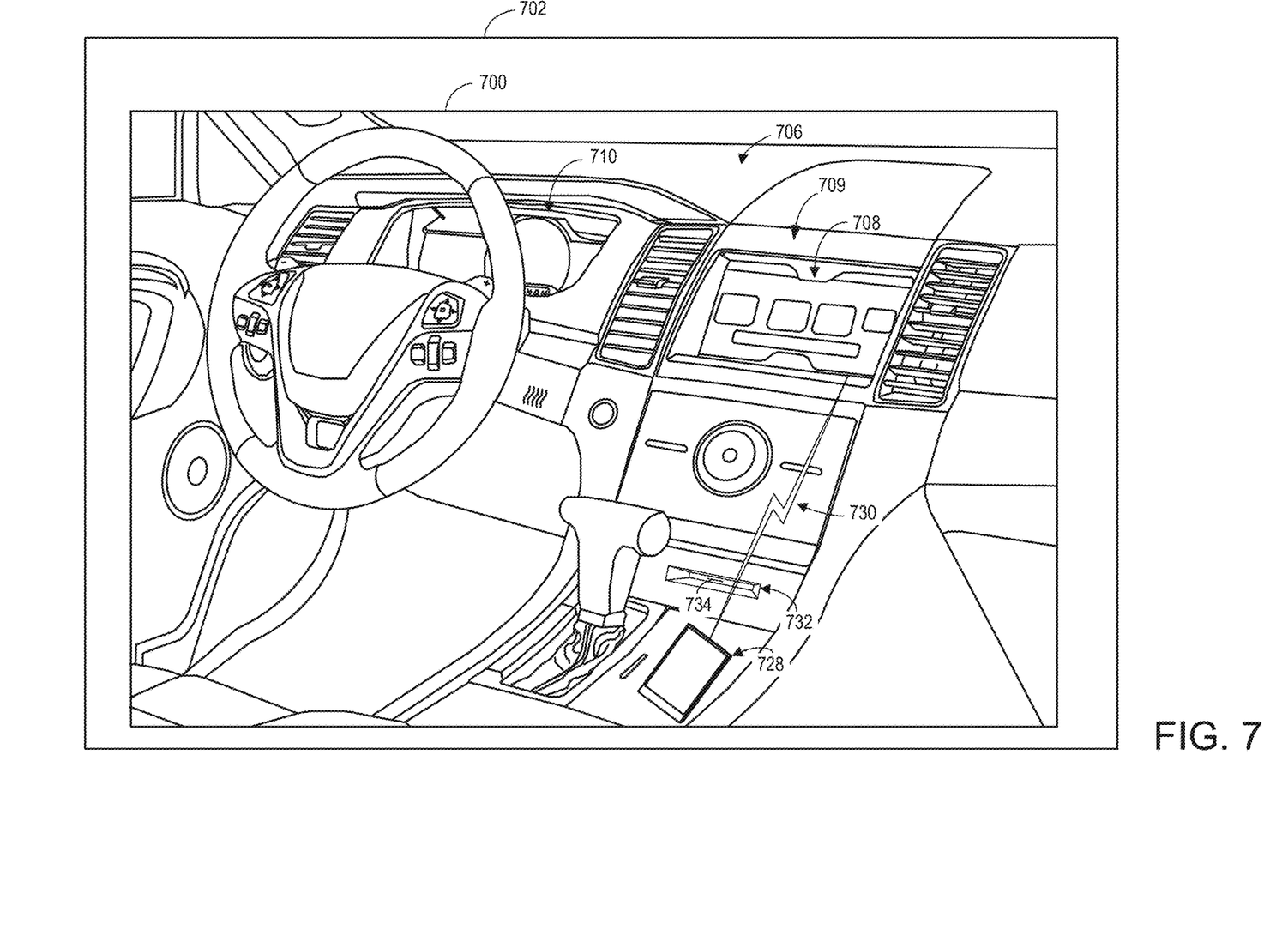
FIG. 7 shows a partial view of a vehicle cabin including a hijacking detector in accordance with one or more embodiments of the present disclosure.

Methods and mechanisms for addressing Base Transceiver Stations (BTSes) that may attempt to hijack Mobile Stations (MSes) are disclosed. FIGS. 1 and 2 depict various hijacking scenarios that MSes may address. FIG. 3 depicts mechanisms that may be used by MSes to detect and thwart hijacking attempts. FIGS. 4A and 4B depict timelines of events between MSes practicing methods for addressing hijacking attempts and potentially-attacking BTSes. FIGS. 5 and 6 depict methods that may address hijacking attempts. FIG. 7 depicts an embodiment of a vehicle that may incorporate a hijacking detector and/or may practice methods for addressing potentially-hijacking BTSes, as disclosed herein.

FIG. 1 shows a first wireless communication hijacking scenario 100. In scenario 100, an MS 110 has a range 112 for wireless communication with BTSes. MS 110 may be incorporated within a hand-held device such as a cellular phone, or may be incorporated within a vehicle. In various embodiments, BTSes may serve cells of a cellular wireless communication system, and as a result wireless communication with a BTS may sometimes be discussed as communication with a "cell." A plurality of legitimate BTSes are operating within range 112, including a BTS 122, a BTS 124, and a BTS 126.

Unfortunately, an attacking BTS 132 is also within range 112, and attacking BTS 132 is attempting to hijack unwary MSes. To that end, attacking BTS 132 introduces itself to various devices in its neighborhood (such as legitimate BTSes and MSes) as a legitimate BTS serving a legitimate cell. Attacking BTS 132 may create a representation of having various properties, such as transmission power properties, that may appear to be better than similar properties of legitimate BTSes in its neighborhood. Attacking BTS 132 may create such representations through falsely reporting a property, or by providing a transmission that measurably demonstrates a property (such as a transmission power property). For example, attacking BTS 132 may present a relatively high-power signal, which may be attractive to MSes, which may not be able to directly authenticate the attacking BTS (e.g., by determining that the BTS is a legitimate BTS serving a legitimate carrier).

The representation of a favorable property of attacking BTS 132 may either be reported to MS 110 (e.g., by a legitimate BTS, or by an attacking BTS), or may be measured or otherwise determined directly by MS 110. In some embodiments, BTS 132 may maintain and report a list of neighboring BTSes, and attacking BTS 132 may inappropriately gain entry to the list of neighboring BTSes, or may pretend to be a legitimate BTS on the list of neighboring BTSes (e.g., by pretending to have an ID of a legitimate BTS). On the basis of a representation that attacking BTS 132 has favorable or improved properties (e.g., relative to legitimate BTSes within range 112), MS 110 may choose to connect to attacking BTS 132.

Connection to attacking BTS 132 may present the potential for attacking BTS 132 to directly attack MS 110. However, MS 110 may already be hardened against at least some attacks. For example, MS 110 may be compliant with a relatively recent release of the mobile telephony standards promulgated by the $3^{rd}$ Generation Partnership Project (3GPP), such as a Long Term Evolution (LTE) standard release, an LTE Advanced standard release, an LTE Advanced Pro standard release, a fourth-generation (4G) 3GPP standard release, or a fifth-generation (5G) or New Radio (NR) 3GPP standard release. Relatively recent releases may incorporate protocols that may harden MSes against attacking BTSes. Accordingly, when MS 110 is operating under compliance with such relatively recent releases (such as by operating in "4G mode"), MS 110 may be hardened against some attacks from attacking BTS 132.

Meanwhile, MS 110 may be backward-compatible with less-recent mobile-telephony standard releases, such as a second-generation (2G) standard release. In comparison with the relatively later standard releases, the relatively earlier standard release may not incorporate as many protocols to harden MSes against attacking BTSes. As a result, connection to attacking BTS 132 may present a potential for attacking BTS 132 to indirectly attack MS 110.

In some scenarios, attacking BTS 132 may be a first attacking BTS, and may be working with a second attacking BTS 134. Attacking BTS 132 may provide a representation to MS 110 that attacking BTS 134 also has properties that appear to be better than similar properties of legitimate BTSes in the neighborhood (and maybe even of attacking BTS 132 itself). On the basis of a representation that attacking BTS 134 has favorable or improved properties, MS 110 may choose to connect to second attacking BTS 134.

Once connected to attacking BTS 134, MS 110 may discover that despite its impression of favorable or improved properties, attacking BTS 134 is only able to comply with a less-recent mobile telephony release, such as 2G. MS 110 may then begin to operate in compliance with the 2G standard. As a result, through a proper concern for maintaining backward-compatibility, MS 110 may expose itself to modes of BTS attack that the 2G standard does not incorporate protocols to harden MSes against. The indirect attack upon MS 110 by first attacking BTS 132 may thus lead to a direct attack upon MS 110 by second attacking BTS 134.

Such attacks may be further camouflaged by the inherent structure of a cellular wireless communication system, which is oriented toward legitimate hand-offs when MSes transition between different cells served by different BTSes. FIG. 2 shows a second wireless communication hijacking scenario 200. An MS 210 may be in motion, and may transition from having a first range 212 to having a second range 214. One or more legitimate BTSes (such as BTS 222) may be operating within first range 212, and one or more legitimate BTSes (such as BTS 228) may be operating within second range 214. Absent any attacks, MS 210 may transition from being connected to BTS 222 to being connected to BTS 228 in the course of moving from the location having first range 212 to the location having second range 214.

There may be one or more attacking BTSes (such as attacking BTS 232) operating within first range 212, and one or more attacking BTSes (such as attacking BTS 236) operating within second range 214. Since cellular wireless communication systems accommodate movement from one cell to another cell, there is nothing inherently problematic with transitioning from being connected to one cellular BTS to being connected to another cellular BTS.

Accordingly, the mere fact of transitioning from being connected to legitimate BTS 222 to being connected to attacking BTS 232 or attacking BTS 236 is not inherently more problematic than would be the mere fact of transitioning from legitimate BTS 222 to legitimate BTS 228. However, as discussed further herein, the nature of wireless communication systems (such as cellular wireless communication systems) may suggest some useful contexts for addressing scenarios in which attacking BTSes attempt to lure unwary MSes: an "intra-cell" context (e.g., while potential new connections are being evaluated, and before a new connection is made), and an "inter-cell" context (e.g., after a new connection has been made).

MS 110 might be hardened against such attacks (whether direct or indirect) by examining properties such as lists of legitimate BTSes in the area, Location Area Codes (LACs), signal strength, radio frequencies, movement speed, and so forth. Other properties that may be examined may include properties communicated by transmitted messages, such as time stamps and addresses. MS 110 might compare perceived values of such properties against expected values of those properties for legitimate BTSes. Detection of attacking BTSes may be made more sophisticated by testing for expected values of an increasingly large list of properties. That list of properties may be relatively small, though, and increasingly-sophisticated attacking BTSes may merely alter the properties that they are represented as having in order to thwart detection.

The methods and mechanisms disclosed herein may advantageously minimize the capacity of increasingly-sophisticated BTSes to alter their represented properties in order to thwart detection. In some embodiments, MSes may operate in a first mode in which intra-cell properties are monitored for potential attacks and a second mode in which inter-cell properties are monitored for potential attacks. The use of both a first mode of monitoring before connection and a second mode of monitoring after connection may advantageously reduce susceptibility to hijacking attacks. Moreover, for some embodiments, MSes may use machine-learning (ML) based techniques to monitor various MS and BTS properties in the context of ML models derived from vast amounts of data regarding MS and BTS properties. The use of ML based techniques may advantageously minimize susceptibility to hijacking attacks.

FIG. 3 shows a block diagram of a hijacking detector 300, which may comprise a feature generator 320, feature standardizers, ML engines, and a decision maker 350 to train and/or deploy ML-based methods and mechanisms for addressing attacking BTSes. Feature generator 320 may comprise a feature builder 322 and a history accumulator 324. Initially, a large number of current records 310 may be provided to feature generator 320, which may then employ ML techniques to develop an ML model for hijacking detector 300. Subsequently, once the ML model has been developed individual current records 310 may be provided to hijacking detector 300 to monitor for attacking BTSes.

The current records 310 may include a number of properties pertaining to an MS and one or more BTSes. The properties may include properties reported to an MS (e.g., properties reported by a BTS) and/or properties measured directly by an MS. Properties may include, for example, a power of a BTS measured by an MS, or information reported by a BTS to an MS (such as information about neighboring BTSes, or information about the power of the BTS of a neighboring BTS).

Some example properties may include or be based on current information, such as: a number of neighboring BTSes (e.g., as reported by a serving BTS); a power ratio between a serving BTS and one or more nearest-neighboring BTSes; a ratio between a power of a serving BTS and a number of neighboring BTSes (e.g., as measured by the MS, or as reported by the serving BTS); a ratio between a power of the first-strongest neighboring BTS and second-strongest neighboring BTS; a variation of a serving BTS power within a time window; a current speed of an MS (e.g., a vehicle speed); a spread of power of BTSes neighboring a serving BTS; and so forth. Some example properties may include or be based on previous information, such as: a previous speed of an MS (e.g., a vehicle speed); a change in a number of neighboring BTSes; an elapsed time since connecting to (e.g., changing to) a BTS; an elapsed time since being connected to (e.g., changing from) a neighboring BTS; an elapsed time from an LAC change; a ratio of a power of a serving BTS and a power of a strongest previously-neighboring BTS; information about a serving BTS from a neighboring BTS list of a previously-serving BTS. In various embodiments, the properties may be based on and/or may combine a wide variety of information about the power and network structure of currently-serving BTSes, previously-serving BTSes, and the neighboring BTSes thereof.

In the course of developing the ML model for hijacking detector 300, any of a variety of ML techniques may be used to develop the ML model based on the large number of current records 310. In some embodiments, either supervised ML techniques, or unsupervised ML techniques, or both may contribute to the ML model. Relevant supervised ML techniques may include various classification or regression techniques (such as support vector machine techniques). Relevant unsupervised ML techniques may include various clustering, pattern-search, or dimension-reduction techniques. For some embodiments, reinforcement learning ML techniques may contribute to the model. In some embodiments, ensemble methods (such as boosting, stacking, and bagging) may contribute to the model. Some embodiments may be based on neural-net techniques and/or deep-learning techniques.

In various embodiments, a list of properties may be identified as being significant for intra-cell monitoring, and may be identified as intra-cell features 326. Similarly, in various embodiments, a list of properties may be identified as being significant for inter-cell monitoring, and me identified as inter-cell features 328. In some embodiments, intra-cell features 326 and/or inter-cell features 328 may be identified before-hand (such as for embodiments in which supervised ML techniques contribute to the ML model). In some embodiments, intra-cell features 326 and/or inter-cell features 328 may be learned as part of the ML technique itself (such as for embodiments in which unsupervised ML techniques contribute to the ML model).

Following sufficient development of the ML model for hijacking detector 300, subsequently-provided current records 310 may include some properties identified as intra-cell features 326 and/or some properties identified as inter-cell features 328. Intra-cell features 326 may be provided to a feature standardizer 336, and then to an ML engine 346 incorporating the trained ML model, or a portion of the ML model trained for intra-cell monitoring (e.g., for monitoring properties identified as intra-cell features 326). ML engine 346 may then calculate an intra-cell score for current record 310 based on the ML model (or the portion of the ML model trained for intra-cell monitoring).

Similarly, inter-cell features 328 may be provided to a feature standardizer 338, and then to an ML engine 348 incorporating the trained ML model, or a portion of the ML model trained for inter-cell monitoring (e.g., for monitoring properties identified as inter-cell features 328). ML engine 348 may then calculate an inter-cell score for current record 310 based on the ML model (or the portion of the ML model trained for inter-cell modeling).

The intra-cell score and/or the inter-cell score may then be provided to decision maker 350, which may receive current record 310 and may associate it with the intra-cell score and/or the inter-cell score. A storage element 352 may also store a combination of current record 310, its intra-cell score, and its intra-cell score, in order to maintain a historical record. A decision logic 354 of decision maker 350 may determine whether current record 310 demonstrates an anomalous condition based upon the intra-cell score and/or inter-cell score. In turn, an anomalous condition may exist when a score matches or exceeds a threshold value.

Furthermore, decision logic 354 may determine whether a BTS is an attacking BTS. In doing so, decision logic 354 might merely evaluate whether an anomalous condition exists for current record 310. For some embodiments, decision logic 354 might instead determine whether a BTS is an attacking BTS by evaluating whether an anomalous condition exists for each of sequence of current records 310. In some embodiments, decision logic 354 might evaluate whether a BTS is an attacking BTS by evaluating whether an anomalous condition exists for a sufficient number of current records 310 out of a sequence of received current records 310. For example, decision logic 354 might evaluate whether an anomalous condition exists for at least four current records 310 out of a sequence of six received current records 310.

Once decision logic 354 has made its determination, decision maker 350 may then present that determination as a decision 360. In various embodiments, the decision may be presented or signaled either as a first value (e.g., a logic "0" to represent a "false" case, or a case in which an anomalous condition has not been detected) or as a second value (e.g., a logic "1" to represent a "true" case, or a case in which an anomalous condition has been detected).

The scores calculated from the ML-based analysis discussed herein may be functions of various properties (e.g., functions of intra-cell properties and/or functions of inter-cell properties), but they may be extraordinarily complicated and complex functions of those properties (e.g., involving one or more layers of matrix multiplication). As a result, in comparison with non-ML approaches in which a relatively small list of properties is directly tested against expected values for those properties, even sophisticated attacking BTSes may not be able to anticipate the complicated, complex function used to determine the presence of anomalous conditions, and its capacity to thwart detection may thereby be minimized.

Moreover, in comparison with a relatively static non-ML approach, the ML model may be updated periodically—and in embodiments in which unsupervised ML techniques contribute to the ML model, the updates may even be substantially continuous and may come from a wide set of distributed contributors. Accordingly, the relatively dynamic approach ML-based approaches described herein may further harden ML approaches against even sophisticated attacking BTSes.

In some embodiments, some or all measurements taken may be taken locally, by an MS. As a result, the analysis to determine whether a BTS is an attacking BTS may be based upon measured properties of various BTSes within a neighborhood, such as various power levels of signals associated with those BTSes, or ratios of various power levels of signals associated with those BTSes. The methods and mechanisms discussed herein may advantageously be independent of protocol details and particular values for network properties. Accordingly, in various embodiments (such as non-ML-based embodiments incorporating analysis of both intra-cell properties and inter-cell properties), the use of combinations of locally-measured properties may advantageously reduce the capacity of sophisticated attacking BTSes to thwart detection.

Hijacking detector 300 may accordingly be operating in a first mode in which intra-cell properties are monitored for potential attacks before connection and a second mode in which inter-cell properties are monitored for potential attacks after connection. FIGS. 4A and 4B show timelines pertaining to methods for detecting hijacking scenarios, in the first mode and the second mode, respectively.

FIG. 4A pertains to a timeline 400 of interaction between an MS, a BTS with which the MS is communicating, and a first neighboring BTS (e.g., of a list of neighboring BTSes). Timeline 400 may arise before connection to a potentially-attacking BTS.

Initially, at a part 412, the MS is connected with the BTS. Subsequently, at a part 422, the BTS may provide various information to the MS, such as a list of neighboring BTSes and/or reports (e.g., of a power associated with itself and/or with one or more of the neighboring BTSes).

At a part 434, the first neighboring BTS may make one or more transmissions that may be measured, and at a part 414, the MS may measure one or more properties of the first neighboring BTS on the basis of the transmissions. In a part 416, the MS may then determine whether the first neighboring BTS is an attacking BTS (e.g., by monitoring for anomalous conditions via intra-cell ML-based monitoring, such as the monitoring performed by hijacking detector 300) and may take action accordingly. For example, if the first neighboring BTS is not determined to be an attacking BTS, then in a part 436, connection to the first neighboring BTS may be permitted; but if the first neighboring BTS is determined to be an attacking BTS, then in a part 418, connection to the first neighboring BTS may be denied. In various embodiments, the action taken by the MS may include alerting other elements of the wireless communication network that the first neighboring BTS may be an attacking BTS.

FIG. 4B pertains to a timeline 450 of interaction between an MS, a first neighboring BTS, and a second neighboring BTS. Timeline 450 may arise after connection to a potentially-attacking BTS. For example, despite a determination in part 436 that the first neighboring BTS is not an attacking BTS, timeline 450 may arise as the MS attempts to determine whether the second neighboring BTS is an attacking BTS—and, if it is, whether that implicates the first neighboring BTS.

Initially, at a part 462, the MS is connected with the first neighboring BTS. Subsequently, at a part 472, the first neighboring BTS may provide various information to the MS, such as a list of its own neighboring BTSes and/or reports (e.g., of a power associated with itself and/or with one or more of its own neighboring BTSes). On its own list of neighboring BTSes, the first neighboring BTS may include the second neighboring BTS.

At a part 474, the first neighboring BTS may make one or more transmissions that may be measured; similarly, at a part 484, the second neighboring BTS may make one or more transmissions that may be measured. At a part 464, the MS may then measure one or more properties of the first neighboring BTS and/or the second neighboring BTS on the basis of the transmissions in part 474 and part 484. In part 466, the MS may determine whether the second neighboring BTS is an attacking BTS (e.g., by monitoring for anomalous conditions via inter-cell ML-based monitoring, such as the monitoring performed by hijacking detector 300) and may take action accordingly. For example, if the second neighboring BTS is not determined to be an attacking BTS, then in a part 486, connection to the second neighboring BTS may be permitted; but if the second neighboring BTS is determined to be an attacking BTS, then in a part 468, the connection with the first neighboring BTS may be ended (and/or connection to the second neighboring BTS may be denied). In various embodiments, the action taken by the MS may include alerting other elements of the wireless communication network that the first neighboring BTS and/or the second neighboring BTS may be attacking BTSes.

In various embodiments, intra-cell monitoring and inter-cell monitoring may be ongoing. Accordingly, MSes may investigate whether BTSes to which it may connect are potentially-attacking BTSes in an intra-cell mode, and may also investigate whether a BTS to which it has already connected, and/or a BTS to which it may connect, is a potentially-attacking BTS in an inter-cell mode. These modes may be in simultaneous operation, such as is depicted regarding hijacking detector 300. In some alternate embodiments, these modes may instead be entered sequentially. Intra-cell monitoring may detect anomalous conditions in the behavior of cells that may serve an MS, which may be advantageous in the context of an MS "camped" on a cell, and inter-cell monitoring may detect anomalous conditions in the behavior of cells to which an MS may have connected, which may be advantageous in the context of an MS following cell selection (or reselection).

FIG. 5 shows a flow chart of some methods for detecting hijacking scenarios, such as may be employed by a hijacking detector 300, or in accordance with timelines 400 and 450.

A method 500 may comprise a processing 510, a calculating 512, and a determining 514, which may relate to monitoring of functions of intra-cell properties. Some embodiments may also comprise a determining 516 and/or a responding 518 that also relate to monitoring of functions of intra-cell properties. In some embodiments, method 500 may additionally comprise a processing 560, a calculating 562, a determining 564, a determining 566, and/or a responding 568, which may relate to monitoring of functions of inter-cell properties. In various embodiments, method 500 may be followed by hijacking detector 300. In various embodiments, method 500 may be followed in accordance with timeline 400 and/or timeline 450.

In processing 510, a record (e.g., a current record 31) having values for a set of obtained data associated with an MS and a BTS of a wireless communication network (e.g., a set of intra-cell features) may be processed. In various embodiments, the obtained data may include data measured by the MS (such as a location, a ground speed, a signal power, a distance from a BTS, a signal-to-noise ratio) or data received from a BTS (which may be available per BTS protocol). The record may comprise features based on intra-cell properties, or example. In calculating 512, a score may be calculated for the record (e.g., an intra-cell score) based on an ML model pertaining to a set of features that are functions of the obtained data. In various embodiments, the ML model may pertain to both intra-cell features and inter-cell features, or may merely pertain to intra-cell features. In determining 514, whether the record demonstrates an anomalous condition may be determined based upon the score. In some embodiments, an anomalous condition may be determined when the score for the record matches some threshold value, or exceeds some threshold value. In some embodiments, the set of features may include one or more features based on a power of the BTS (e.g., as measured by the MS) or a reported power received from the BTS.

In some embodiments, the set of features may include a ratio between a number of neighboring BTSes reported by the BTS and a maximal number of neighboring BTSes. For some embodiments, the set of features may include a ratio between a power of the BTS and a power of a most-powerful BTS of the neighboring BTSes. In some embodiments, the set of features may include a variance of a measured or reported power of the BTS within a time window. For some embodiments, the set of features may include a ratio between the number of neighboring BTSes reported by the BTS and the power of the BTS; and a ratio of a measured or reported power of a most-powerful BTS of the neighboring BTSes and a next-most-powerful BTS of the neighboring BTSes.

In a variety of embodiments, the record may be one of a sequence of records corresponding with consecutive times spaced by periodic intervals. In some such embodiments, in determining 516, the BTS may be determined to be an attacking BTS when at least four of the plurality of records, which correspond with six consecutive times, demonstrate an anomalous condition.

For some embodiments, the set of obtained data may be a first set of obtained data, the set of features may be a first set of features (e.g., an intra-cell set of features), the BTS may be a first BTS, the record may be a first portion of a record (e.g., an intra-cell portion of the record), the machine-learning model is a first machine-learning model, and the score may be a first score. In some such embodiments, in processing 560, a portion of the record (e.g., an inter-cell portion of the record) having values for a second set of obtained data associated with the MS, the first BTS, and a second BTS of the wireless communication network (e.g., a set of inter-cell features) may be processed. In calculating 562, a second score may be calculated for the second portion of the record (e.g., an inter-cell score) based on an ML model pertaining to a second set of features that are functions of the obtained data. In various embodiments, the ML model may pertain to both intra-cell features and inter-cell features (e.g., the ML model may be the same ML model used in calculating 512), or may merely pertain to inter-cell features. In determining 564, whether the second record portion demonstrates an anomalous condition may be determined based upon the second score. In some embodiments, an anomalous condition may be determined when the second score for the second record portion matches some threshold value, or exceeds some threshold value. The second set of features may include one or more features based on a power of the BTS (e.g., as measured by the MS), a reported power received from the BTS.

In some embodiments, the second set of features may include a power from the second BTS to the first BTS at one or more preceding times. For some embodiments, the second set of features may include one or more of the first set of features at one or more preceding times (e.g., previous values for any of a variety of intra-cell properties). In some embodiments, the second set of features may include a ratio between a power of the second BTS and a power of the first BTS. For some embodiments, the second set of features may include a ratio between the power of the second BTS and an average of the power of the second BTS within a time window. In some embodiments, the second set of features may include a speed of the MS (which may in turn be a speed of a vehicle in which the MS is incorporated).

In some embodiments, in determining 566, at least one of the first BTS and the second BTS may be determined to be an attacking BTS when the second record portion demonstrates an anomalous condition. For some embodiments, the first record portion and the second record portion may be portions of the same record (e.g., the same record may contain both intra-cell and inter-cell portions).

In some embodiments, the MS may be incorporated into a mobile telephone, while in some embodiments, the MS may be incorporated into a vehicle. In various embodiments, the wireless communication network may be a cellular wireless communication network.

Various embodiments—which may include some non-ML-based embodiments—may advantageously incorporate monitoring of both intra-cell properties and inter-cell properties. FIG. 6 shows a flow chart of methods for detecting hijacking scenarios that may arise between a first BTS, a second BTS, and an MS (e.g., an MS incorporated within a vehicle). A method 600 may comprise a monitoring 610 and a monitoring 620, which may relate to monitoring of functions of intra-cell properties and monitoring of functions of inter-cell properties, respectively. Some embodiments may also comprise a determining 630, a determining 640, and/or a responding 650.

Monitoring 610 may include operating in a first mode that monitors for anomalies in a set of intra-cell properties associated with an MS and a first BTS of a wireless cellular communication network. At least one of the set of intra-cell properties may be based on a measured power of the BTS and/or a reported power received from the BTS. Monitoring 620 may include operating in a second mode that monitors or anomalies in a set of inter-cell properties associated with the MS, the first BTS, and a second BTS of the wireless cellular communication network. At least one of the set of inter-cell properties may be based on a measured power of the BTS corresponding with an earlier set of intra-cell properties and/or a reported power received from the BTS corresponding with an earlier set of intra-cell properties.

In a variety of embodiments, the set of intra-cell properties may be one of a sequence of sets of intra-cell properties corresponding with a plurality of consecutive times spaced by periodic intervals. In some such embodiments, in determining 630, at least one of the first BTS and the second BTS may be determined to be an attacking BTS when at least four of the plurality of sets of intra-cell properties, which correspond with six consecutive times, demonstrate an anomalous condition.

In a variety of embodiments, in determining 640, at least one of the first BTS and the second BTS maybe determined to be an attacking BTS when the set of inter-cell properties demonstrates an anomalous condition.

In some embodiments, the set of intra-cell properties may include a ratio between a number of neighboring BTSes reported by the BTS and a maximal number of neighboring BTSes. For some embodiments, the set of intra-cell properties may include a ratio between a power of the BTS and a power of a most-powerful BTS of the neighboring BTSes. In some embodiments, the set of intra-cell properties may include a variance of a measured or reported power of the BTS within a time window. For some embodiments, the set of intra-cell properties may include a ratio between the number of neighboring BTSes reported by the BTS and the power of the BTS. In some embodiments, the set of intra-cell properties may include a ratio of a measured or reported power of a most-powerful BTS of the neighboring BTSes and a next-most-powerful BTS of the neighboring BTSes.

In some embodiments, the set of inter-cell properties may include a power from the second BTS to the first BTS at one or more preceding times. For some embodiments, the set of inter-cell properties may include one or more of the set of inter-cell properties at one or more preceding times. In some embodiments, the set of inter-cell properties may include a ratio between a power of the second BTS and a power of the first BTS. For some embodiments, the set of inter-cell properties may include a ratio between the power of the second BTS and an average of the power of the second BTS within a time window. some embodiments, the set of inter-cell properties may include a speed of the MS (e.g., a speed of a vehicle incorporating the MS).

The methods discussed herein may be performed, at least in part, within a vehicle. FIG. 7 shows a partial view of an interior of a vehicle cabin 700 of a vehicle 702, which may include a hijacking detector (such as hijacking detector 300 or a hijacking detector operating in accordance with timeline 400 and/or timeline 450).

As shown, an instrument panel 706 may include various displays and controls accessible to a driver (also referred to as the user) of vehicle 702. For example, instrument panel 706 may include a touch screen 708 of an in-vehicle computing system 709 (e.g., an infotainment system), an audio system control panel, and an instrument cluster 710.

In some embodiments, one or more hardware elements of in-vehicle computing system 709, such as touch screen 708, a display screen, various control dials, knobs and buttons, memory, processor(s), and any interface elements (e.g., connectors or ports) may form an integrated head unit that is installed in instrument panel 706 of vehicle 702. The head unit may be fixedly or removably attached in instrument panel 706. In additional or alternative embodiments, one or more hardware elements of the in-vehicle computing system may be modular and may be installed in multiple locations of the vehicle.

The cabin 700 may also include one or more user objects, such as mobile device 728, that are stored in the vehicle before, during and/or after traveling. Mobile device 728 may include a smart phone, a tablet, a laptop computer, a portable media player, and/or any suitable mobile computing device. Mobile device 728 may be connected to in-vehicle computing system 709 via communication link 730. Communication link 730 may in turn be wired (e.g., via Universal Serial Bus (USB), Mobile High-Definition Link (MHL), High-Definition Multimedia Interface (HDMI), and so on) or wireless (e.g., via BLUETOOTH, WI-FI, Near-Field Communication (NFC), and so on) and configured to provide two-way communication between mobile device 728 and in-vehicle computing system 709. For example, communication link 730 may provide sensor and/or control signals from in-vehicle systems and touch screen 708 to mobile device 728 and may provide control and/or display signals from mobile device 728 to in-vehicle systems and touch screen 708. Communication link 730 may also provide power to mobile device 728 from an in-vehicle power source in order to charge an internal battery of mobile device 728.

While mobile device 728 is illustrated as being spatially separated from in-vehicle computing system 709 and connected via a substantially external communication link (e.g., a cable or radiofrequency signal), it is to be understood that a mobile device storage structure 732 or other storage structure may be formed in instrument panel 706 or another location in the vehicle to hold mobile device 728 in a particular location. Mobile device storage structure 732 may include an integrated connector 734 to which mobile device 728 may be attached or "docked" for providing a substantially internal communication link between mobile device 728 and in-vehicle computing system 709.

In various embodiments, in-vehicle computing system 709 may incorporate a hijacking detector (such as hijacking detector 300), and may otherwise practice methods for addressing potentially-hijacking BTSes (such as methods 500 and 600), in accordance with timelines 400 and 450. In some embodiments, mobile device 728 may incorporate such hijacking detectors, and/or may otherwise practice such methods for addressing potentially-hijacking BTSes.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and mobile devices described above with respect to FIG. 7. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method for a wireless cellular communication system incorporated in a vehicle, comprising:
processing a record having a set of obtained data for a set of intra-cell features associated with a Mobile Station (MS) and a Base Transceiver Station (BTS) of a wireless communication network, the set of intra-cell features being functions of the set of obtained data;
calculating a score for the record based on a machine-learning model pertaining to the set of intra-cell features; and
determining whether the record demonstrates an anomalous condition based upon the score,
wherein the set of intra-cell features is selected from: (1) a ratio between a number of neighboring BTSes reported by the BTS and a maximal number of neighboring BTSes; (2) a ratio between a power of the BTS and a power of a most-powerful BTS of the neighboring BTSes; (3) a variance of a measured power of the BTS within a time window; (4) a ratio between the number of neighboring BTSes reported by the BTS and the power of the BTS; and (5) a ratio of a measured power of a most-powerful BTS of the neighboring BTSes and a next-most-powerful BTS of the neighboring BTSes.

2. The method of claim 1, wherein the record is one of a plurality of records that respectively correspond with a plurality of consecutive times spaced by periodic intervals, the method further comprising: determining that the BTS is an attacking BTS when at least a predetermined number of the plurality of records, which correspond with a predetermined number consecutive times, demonstrate an anomalous condition.

3. The method of claim 2, wherein the predetermined number of the plurality of records is four of the plurality of records.

4. The method of claim 2, wherein the predetermined number of consecutive times is six consecutive times.

5. The method of claim 1, wherein the set of obtained data is a first set of obtained data, the set of intra-cell features is a first set of intra-cell features, the BTS is a first BTS, the record is a first record portion, the machine-learning model is a first machine-learning model, and the score is a first score, the method further comprising:
processing a second record portion having values for a second set of obtained data associated with the MS, the first BTS, and a second BTS of the wireless communication network;
calculating a second score for the second record portion based on a second machine-learning model pertaining to a second set of intra-cell features that are functions of the second set of obtained data; and
determining whether the second record portion demonstrates an anomalous condition based upon the second score.

6. The method of claim 5, wherein the second set of intra-cell features includes one or more of: (1) a power from the second BTS to the first BTS at one or more preceding times; (2) one or more of the first set of intra-cell features at one or more preceding times; (3) a ratio between a power of the second BTS and a power of the first BTS; (4) a ratio between the power of the second BTS and an average of the power of the second BTS within a time window; and (5) a speed of the MS.

7. The method of claim 5, wherein the first record portion and the second record portion are portions of the same record.

8. A method for a wireless cellular communication system incorporated in a vehicle, for monitoring wireless cellular communication between a first Base Transceiver Station (BTS), a second BTS, and a Mobile Station (MS) incorporated within the vehicle, comprising:
monitoring, in a first mode, for anomalies in a set of functions of intra-cell properties associated with the MS and the first BTS;
monitoring, in a second mode, for anomalies in a set of functions of inter-cell properties associated with the MS, the first BTS, and the second BTS, wherein at least one of the set of functions of inter-cell properties is based on an earlier set of functions of intra-cell properties; and
performing at least one action in response to the monitoring,
wherein the set of functions of intra-cell properties is selected from: (1) a ratio between a number of neighboring BTSes reported by the BTS and a maximal number of neighboring BTSes; (2) a ratio between a power of the BTS and a power of a most-powerful BTS of the neighboring BTSes; (3) a variance of a measured power of the BTS within a time window; (4) a ratio between the number of neighboring BTSes reported by the BTS and the power of the BTS; and (5) a ratio of a measured power of a most-powerful BTS of the neighboring BTSes and a next-most-powerful BTS of the neighboring BTSes.

9. The method of claim 8, further comprising: determining that the BTS is an attacking BTS when at least a predetermined number of the plurality of sets of functions of intra-cell properties, which correspond with a predetermined number consecutive times, demonstrate an anomalous condition.

10. The method of claim 9, further comprising: wherein the predetermined number of the plurality of sets of functions of intra-cell properties is four of the plurality of sets of functions of intra-cell properties; and wherein the predetermined number of consecutive times is six consecutive times.

11. A wireless cellular communication system incorporated in a vehicle, comprising:
an antenna;
a processor; and
a storage device storing instructions executable by the processor to:
process a record having a set of obtained data for a set of intra-cell features associated with a Mobile Station (MS) and a Base Transceiver Station (BTS) of a wireless communication network, the set of intra-cell features being functions of the set of obtained data;
calculate a score for the record based on a machine-learning model pertaining to the set of intra-cell features; and
determine whether the record demonstrates an anomalous condition based upon the score,
wherein the set of intra-cell features is selected from: (1) a ratio between a number of neighboring BTSes reported by the BTS and a maximal number of neighboring BTSes; (2) a ratio between a power of the BTS and a power of a most-powerful BTS of the neighboring BTSes; (3) a variance of a measured power of the BTS within a time window; (4) a ratio between the number of neighboring BTSes reported by the BTS and the power of the BTS; and (5) a ratio of a measured power of a most-powerful BTS of the neighboring BTSes and a next-most-powerful BTS of the neighboring BTSes.

12. The method of claim 11, wherein the record is one of a plurality of records that respectively correspond with a plurality of consecutive times spaced by periodic intervals, the instructions executable by the processor being further to: determine that the BTS is an attacking BTS when at least four of the plurality of records, which correspond with six consecutive times, demonstrate an anomalous condition.

13. The method of claim 11, wherein the set of obtained data is a first set of obtained data, the BTS is a first BTS, the record is an intra-cell record, the machine-learning models is a first machine-learning model, and the score is a first score, the instructions executable by the processer being further to: process an inter-cell record having a second set of obtained data for a set of inter-cell features associated with the MS, the first BTS, and a second BTS of the wireless communication network, the set of inter-cell features being functions of the second set of obtained data; calculate a second score for the inter-cell record based on a second machine-learning model pertaining to the set of inter-cell features; and determine whether the inter-cell record demonstrates an anomalous condition based upon the score.

14. The method of claim 13, wherein the set of inter-cell features includes one or more of: (1) a power from the second BTS to the first BTS at one or more preceding times; (2) one or more of the first set of features at one or more preceding times; (3) a ratio between a power of the second BTS and a power of the first BTS; (4) a ratio between the power of the second BTS and an average of the power of the second BTS within a time window; and (5) a speed of the MS.

15. The method of claim 13, the instructions executable by the processor being further to: determine that at least one of the first BTS and the second BTS is an attacking BTS when the inter-cell record demonstrates an anomalous condition.

* * * * *